United States Patent
Narayanaswamy et al.

(10) Patent No.: US 12,256,127 B2
(45) Date of Patent: Mar. 18, 2025

(54) SYNCHRONIZED PLAYBACK CONTROLS FOR PARALLEL VIEWING OF VIDEO CONTENT

(71) Applicant: ARRIS Enterprises LLC, Suwanee, GA (US)

(72) Inventors: Ramesh Narayanaswamy, Karnataka (IN); Praveen Girish, Karnataka (IN)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 17/737,557

(22) Filed: May 5, 2022

(65) Prior Publication Data
US 2023/0025563 A1    Jan. 26, 2023

Related U.S. Application Data (60) Provisional application No. 63/224,528, filed on Jul. 22, 2021.

(51) Int. Cl.
*H04N 21/472* (2011.01)
*H04N 21/43* (2011.01)
*H04N 21/6587* (2011.01)

(52) U.S. Cl.
CPC .  *H04N 21/47217* (2013.01); *H04N 21/43076* (2020.08); *H04N 21/6587* (2013.01)

(58) Field of Classification Search
None
See application file for complete search history.

(56) References Cited

U.S. PATENT DOCUMENTS

| | | | | |
|---|---|---|---|---|
| 2006/0236352 | A1* | 10/2006 | Scott, III | H04N 5/76 348/E7.071 |
| 2013/0016955 | A1* | 1/2013 | Pejaver | H04N 21/242 386/E9.011 |
| 2013/0067116 | A1* | 3/2013 | Ostergren | H04L 65/764 709/248 |
| 2014/0096169 | A1* | 4/2014 | Dodson | H04N 21/6543 725/97 |
| 2020/0260154 | A1* | 8/2020 | Comito | H04N 21/437 |
| 2021/0344993 | A1 | 11/2021 | Epstein | |
| 2022/0368993 | A1* | 11/2022 | Kim | H04N 21/4788 |

* cited by examiner

*Primary Examiner* — Heather R Jones
(74) *Attorney, Agent, or Firm* — Panitch Schwarze Belisario & Nadel LLC (57) ABSTRACT

A method, a non-transitory computer readable medium, and a system are disclosed for synchronized playback controls for viewing of video content. The method includes connecting, to a synchronization service, a plurality of media consumption devices; receiving, on the synchronization service, a control request from one or more of the plurality of media consumption devices; and sending, from the synchronization service, a control signal to each of the plurality of media consumption devices to implement a playback control to synchronize a playback of the video content in each of the plurality of media consumption devices.

18 Claims, 6 Drawing Sheets

SYNCHRONIZED PLAYBACK CONTROLS FOR PARALLEL VIEWING OF VIDEO CONTENT

TECHNICAL FIELD

The present disclosure generally relates to a method and system for synchronized playback controls for parallel viewing of video content.

BACKGROUND

Social television applications allow several users to watch the same content from different locations and derive a feeling of watching the program together. Such applications invariably include options for users to interact with each other, for example, using voice or text. However, the individual playback control limits the true experience of togetherness. If each of the viewers were sitting in the same room, they could pause and play the content at will. For example, the users may also want to pause the content to make a comment, rewind to watch a portion of the video content again, and fast forward to skip a portion of the video content. None of this is possible in a normal social television application.

SUMMARY

In accordance with exemplary embodiments, it would be desirable to have a method and system for synchronized playback controls for parallel viewing of video content with trick play controls, for example, pause, skip, resume, and fast-forward, which is able to maintain a single play state for each of the users.

In accordance with an aspect, a method is disclosed for synchronized playback controls for viewing of video content, the method comprising: connecting, to a synchronization service, a plurality of media consumption devices; receiving, on the synchronization service, a control request from one or more of the plurality of media consumption devices; and sending, from the synchronization service, a control signal to each of the plurality of media consumption devices to implement a playback control to synchronize a playback of the video content in each of the plurality of media consumption devices.

In accordance with another aspect, a non-transitory computer readable medium storing computer readable program code that, when executed by a processor, causes the processor to provide synchronized playback controls for viewing of video content, the program code comprising instructions for: connecting, to a synchronization service, a plurality of media consumption devices; receiving, on the synchronization service, a control request from one or more of the plurality of media consumption devices; and sending, from the synchronization service, a control signal to each of the plurality of media consumption devices to implement a playback control to synchronize a playback of the video content in each of the plurality of media consumption devices.

In accordance with an aspect, a system is disclosed for synchronized playback controls for viewing of video content, the system comprising: a memory; and a processor configured to: connect to a plurality of media consumption devices; receive a control request from one or more of the plurality of media consumption devices; and send a control signal to each of the plurality of media consumption devices to implement a playback control to synchronize a playback of the video content in each of the plurality of media consumption devices.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
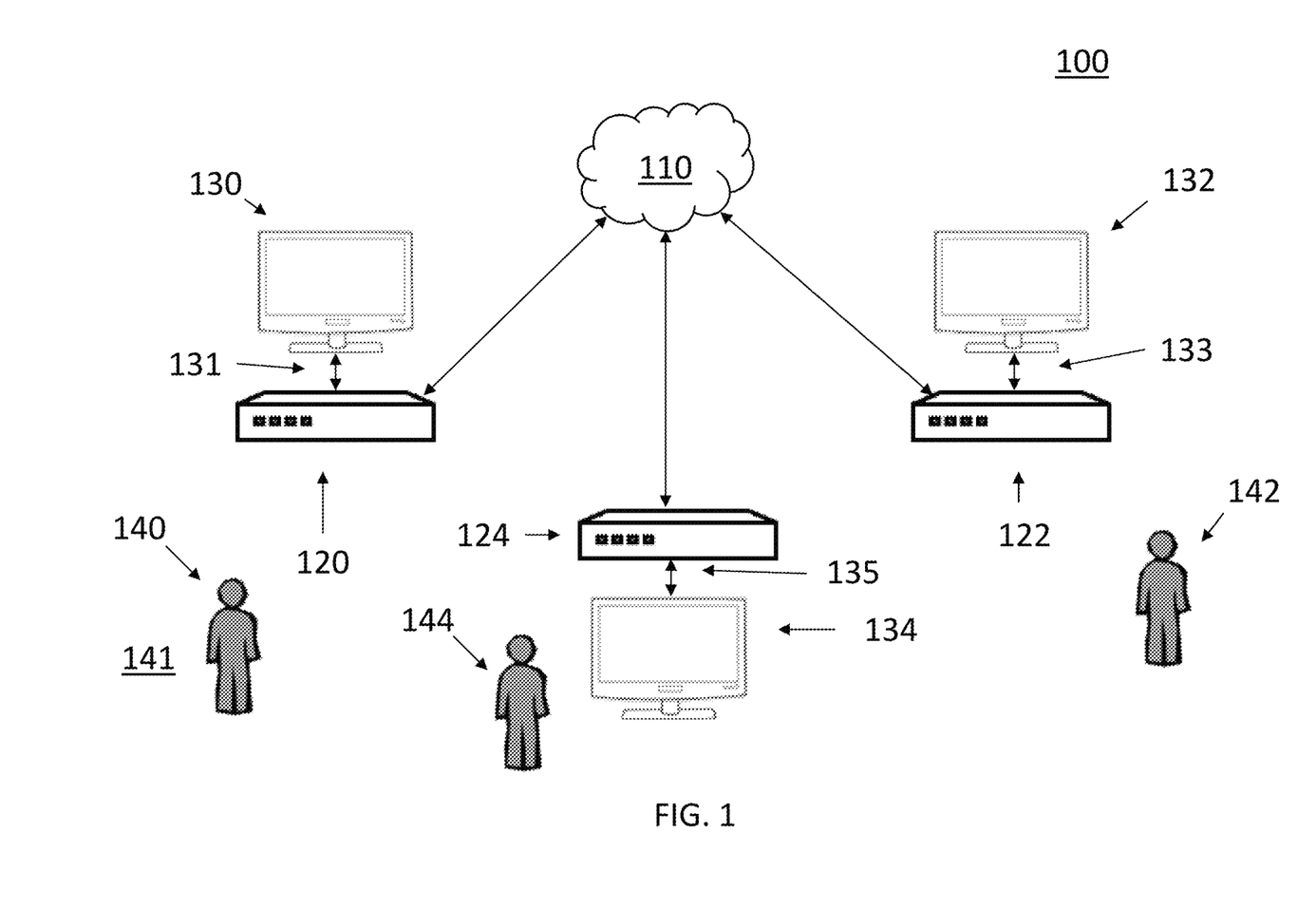
FIG. 1 is an illustration of an exemplary network environment for an application of a social television application.

System for Synchronized Playback Controls for Parallel Viewing of Video Content FIG. 1 is a block diagram illustrating an example network environment 100 for synchronized playback controls for parallel viewing of video content. In embodiments, a content provider 110, for example, a content delivery network (CDN) or content cloud server can provide, for example, media content, for example, video and/or data services to a plurality of media consumption devices 120, 122, 124. In accordance with an exemplary embodiment, one or more of the media consumption devices 120, 122, 124 can be a set-top box (STB). Each of the plurality of media consumption devices (or set-top boxes) 120, 122, 124 may communicate with one or more remote media play devices 130, 132, 134 over a local network 131, 133, 135 (for example, a local area network (LAN), a wireless local area network (WLAN), a personal area network (PAN), etc.) and/or wired, for example, a television.

In accordance with an exemplary embodiment, the plurality of remote media play devices 130, 132, 134 may be any type of computing device configured to connect via a wireless network, for example, wireless network utilizing an IEEE 802.11 specification, including a smart phone, a smart TV, a computer, a mobile device, a tablet, or any other device operable to communicate wirelessly with the media consumption devices 120, 122, 124. In accordance with an alternative embodiment, one or more of the plurality of remote media play devices 130, 132, 134 can be a television, for example, that is directly connected or wired to the media consumption device 120, 122, 124.

In accordance with an exemplary embodiment, the plurality of users 140, 142, 144 may be, for example, geographically distributed across different locations. The users 140, 142, 144 can be receiving video content from a content delivery network (CDN) setup, for example, as content cloud 110. When a user 140, for example, at a first location 141 pauses the video, the user 140 will be out of sync with the other users 142, 144 immediately. Even if the users 140, 142, 144 talk to each other through some means of communication and pause it as closely as possible, the users 140, 142, 144 will never be in perfect sync. The resuming and catching up part of the video content can be even more troublesome. Accordingly, it would be desirable to have a method and system for synchronized playback controls for parallel viewing of video content in which the users get a synchronized playback experience, for example, even when they invoke trick play controls (e.g., pause, resume, skip, fast-forward, rewind, etc. modes) in a distributed viewing of the same media content.

Figure 2:
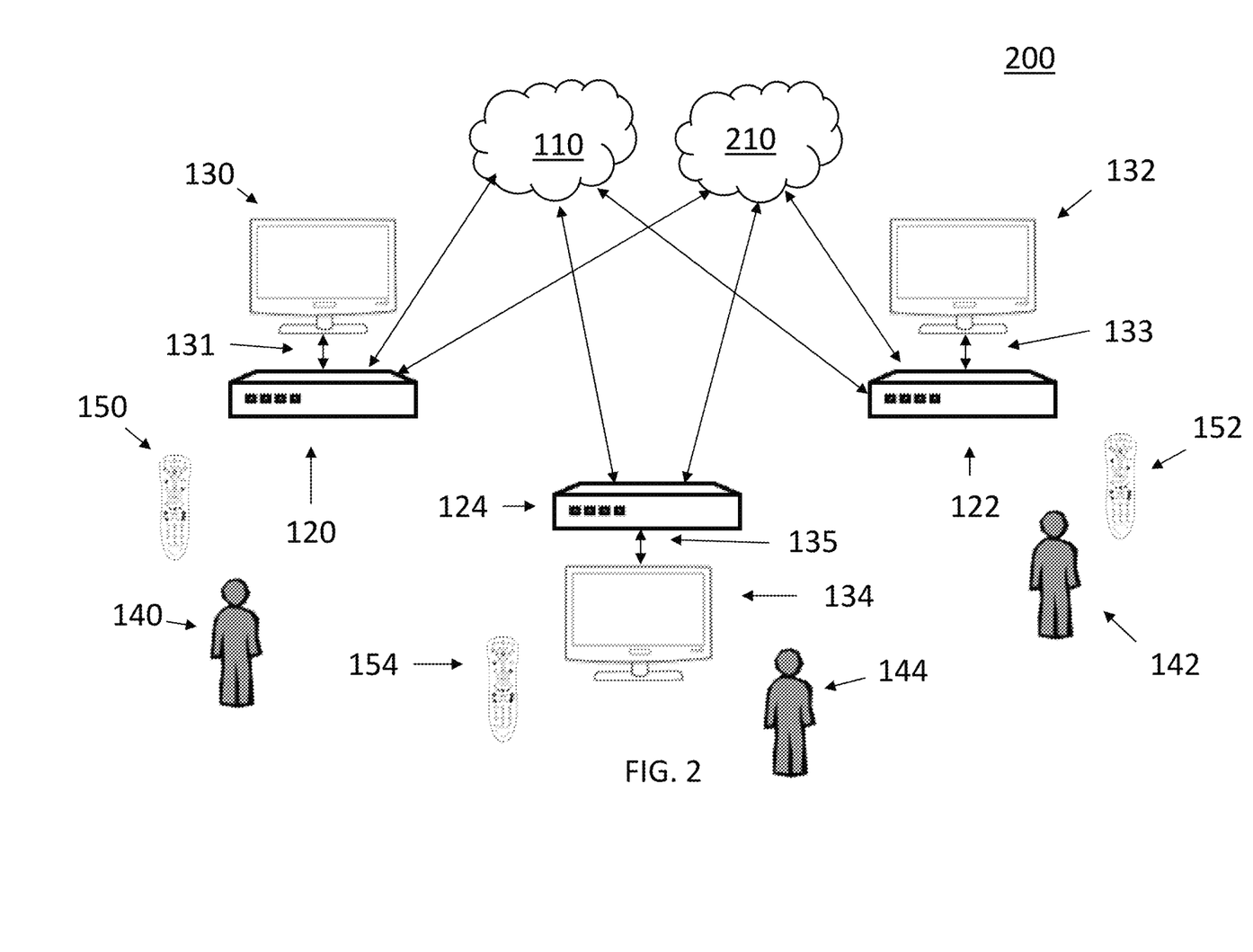
FIG. 2 is an illustration of an exemplary network for a method and system for synchronized playback controls for parallel viewing of video content.

FIG. 2 is an illustration of an exemplary network 200 for a method and system for synchronized playback controls for parallel viewing of video content in accordance with an exemplary embodiment. As shown in FIG. 2, the network 200 includes the content provider 110, the plurality of media consumption devices 120, 122, 124, the one or more remote media play devices 130, 132, 134, and a playback synchronization service 210. In accordance with an exemplary embodiment, the playback synchronization service 210 can be, for example, hosted and executed on a cloud server. In accordance with an alternative embodiment, rather than a cloud server, the playback synchronization service 210 can be hosted, for example, in one of the media consumption devices 120, 122, 124.

In accordance with an exemplary embodiment, each of the plurality of media consumption devices 120, 122, 124 can include a remote controller 150, 152, 154, which can execute one or more of the synchronized playback controls for parallel viewing of video content as disclosed herein. In accordance with an exemplary embodiment, the playback synchronization service 210 is configured to synchronize each of the media consumption devices 120, 122, 124.

In accordance with an exemplary embodiment, the remote controller 150, 152, 154 can be a radio-frequency (RF) or infrared (IR) remote controller, other embodiments may use other media and/or protocols to convey commands to the media consumption device 120, 122, 124. For example, commands may be conveyed to the media consumption device 120, 122, 124 via USB, WiFi (IEEE 802.11-family protocols), and/or Bluetooth techniques, all of which are well known in the field of network communications from other wireless devices such as smart phones, tablets, consoles, or nearly any other wired or wireless computing device that is specifically programmed to carry out these functions, etc.

Figure 3:
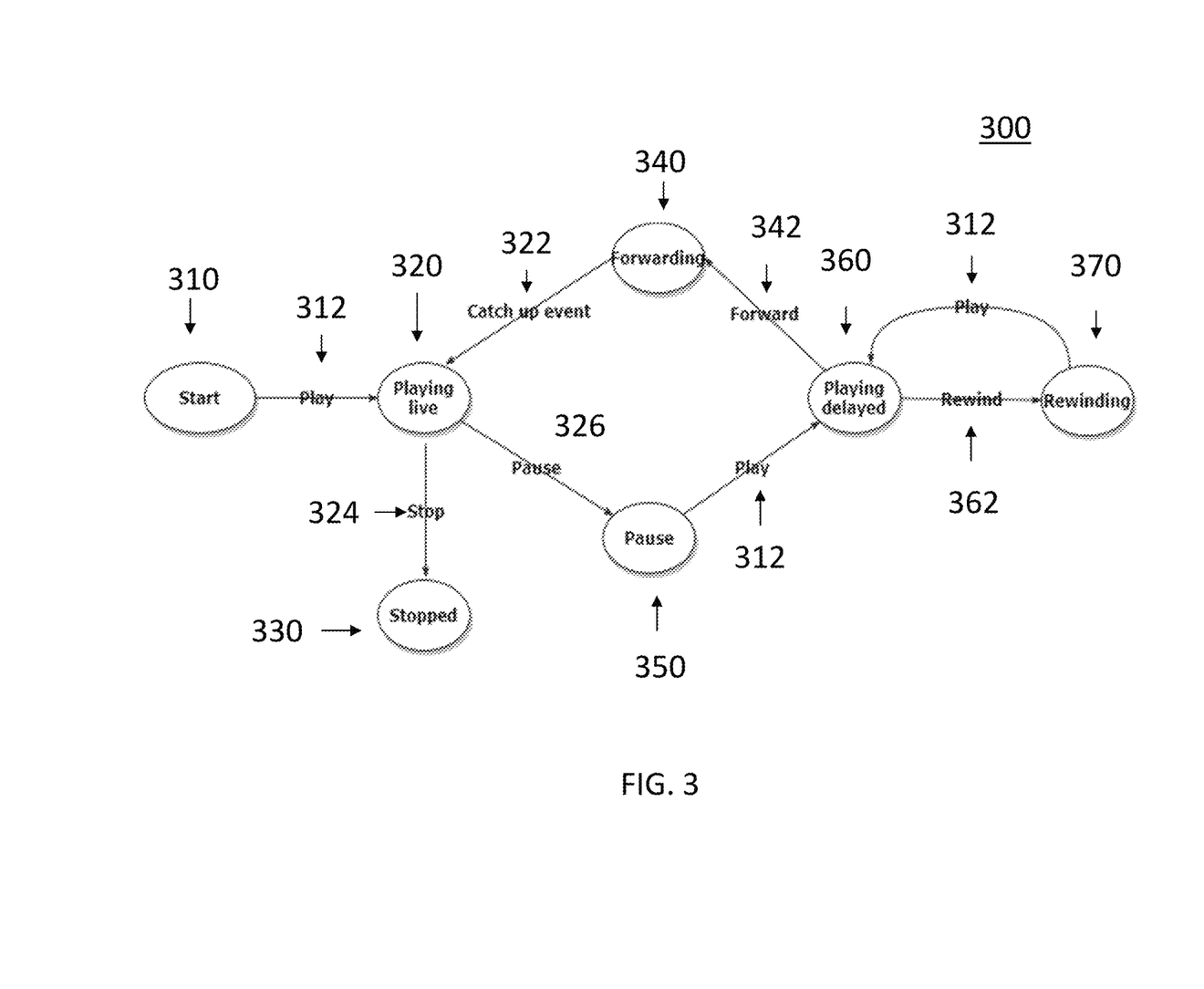
FIG. 3 is an illustration of states of a media consumption device in accordance with an exemplary embodiment.

FIG. 3 is an illustration of states 300 of a media consumption device 120, 122, 124 with synchronized playback controls for parallel viewing of video content in accordance with an exemplary embodiment. As shown in FIG. 3, the states 300 of the media consumption device 120, 122, 124 can include a plurality of states of the video content, for example, start 310, playing Live (e.g., live play) 320, stopped 330, forwarding (e.g., fast-forwarding) 340, pause 350, playing delayed (or play delayed) 360, and rewinding (e.g., rewind) 370. Upon selection, for example, via an input key on a remote controller 150, 152, 154, play 312, a signal can be sent to the playback synchronization service 210 to begin the live playing (playing live) 320 of the video content from the content provider 110 to each of the plurality of media consumption devices 120, 122, 124. In accordance with an exemplary embodiment, the key commands on the remote controller 150, 152, 154 do not directly control local playback. Instead, the key input on the remote controller 150, 152, 154 is transmitted to the playback synchronization service 210, which in turn provides a control signal to each of the connected media consumption devices 120, 122, 124.

In accordance with an exemplary embodiment, for example, the trick play options can include play 312, catch-up event 322, stop 324, forward (or fast-forward) 342, and rewind 362, which can be selected, for example, via a remote controller 150, 152, 154, via the selection of one or more keys. In accordance with an exemplary embodiment, the selection of play 312 can be configured on the playback synchronization service 210 to require each of the plurality of users 140, 142, 144, to make the play 312 selection to invoke playing of the video content. Alternatively, the selection of play 312 can be configured to a global setting requiring each of the users 140, 142, 144 to select play 312, or a portion of the users 140, 142, 144, for example, if a large number of users are viewing the video content, e.g., at least 50% or more of the users 140, 142, 144.

Once the video content begins playing live 320, signals for a catch up event (or fast forwarding) 322, stop 324, or pause 326 can be received by the playback synchronization service 210 from one of the remote controllers 150, 152, 154, associated with a corresponding media consumption device 120, 122, 124. As set forth above, the playback synchronization service 210 can then send a signal to each of the media consumption devices 120, 122, 124 to execute simultaneously, forwarding 340, stopping 330 or playing delayed (e.g., paused) 350 of the video content being received from the content provider 110. In addition, states of playing delayed (e.g., paused) 360 or rewinding (e.g., rewind) 370 can be initiated with signals for play 312, forward 342, and rewind 362.

Figure 4:
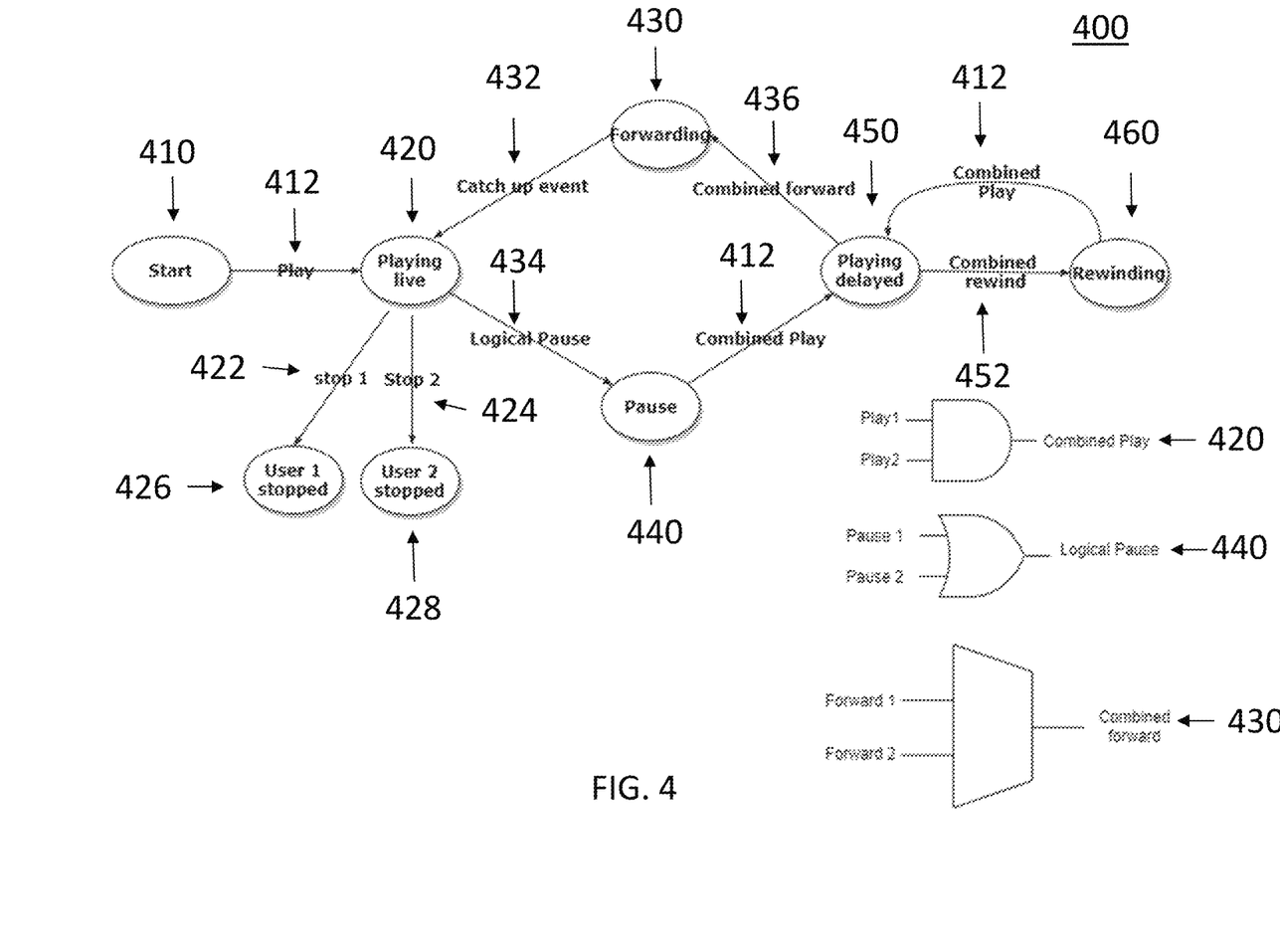
FIG. 4 is an illustration of states of a media consumption device for a social television setup in accordance with an exemplary embodiment.

FIG. 4 is an illustration of states 400 of a media consumption device 120, 122, 124 with synchronized playback controls for parallel viewing of video content for a social television setup in accordance with an exemplary embodiment. For example, a new media consumption device 120, 122, 124 may wish to join the system 200 when other media consumption devices 120, 122, 124 are in states other than "playing Live". In accordance with an exemplary embodiment, the playback synchronization service 210 can provide necessary state and position parameters so the newly joined media consumption device 120, 122, 124 can start playback from exactly same location (for example, timestamp on the video content) as with the other media consumption devices 120, 122, 124. Thus, the playback synchronization service 210 cannot only maintain a current playback or viewing of the video content, but can also allow a new user 140, 142, 144 to join in the viewing experience at the exact position of the other users 140, 142, 144, and corresponding media consumption devices 120, 122, 124.

In accordance with an exemplary embodiment, each of the player command requests will be forwarded to the playback synchronization service 210 where the overall state machine is maintained. Based on the inputs obtained, a new state will be derived, and player commands or player signals are provided to each of the media consumption devices 120, 122, 124 in the system 200. In accordance with an exemplary embodiment, the video content can be provided from the content provider 110, for example, as HTTP live streaming (HLS) or Dynamic Adaptive Streaming over HTTP (MPEG-DASH) content.

In accordance with an exemplary embodiment, as shown in FIG. 4, the states 400 of the media consumption device 120, 122, 124 are derived as a function of events from each of the individual users 140, 142, 144, instead of a single user 140, 142, 144, for example, as shown in FIG. 3. As shown in FIG. 4, the plurality of states of the video content, for example, start 410, playing Live (e.g., live play) 420, User 1 140 stopped 426, User 2 142 stopped 428, forwarding (e.g., fast-forwarding) 430, paused 440, playing delayed (or play delayed) 450, and rewinding (e.g., rewind) 460. Upon selection, for example, via an input key on a remote controller 150, 152, 154, a combined play 412, a signal can be sent to the playback synchronization service 210 to begin the live playing (playing live) 420 of the video content from the content provider 110 to each of the plurality of media consumption devices 120, 122, 124. As set forth above, the key commands on the remote controller 150, 152, 154 do not directly control local playback. Instead, the key input on the remote controller 150, 152, 154 is transmitted to the playback synchronization service 210, which in turn provides a control signal to each of the connected media consumption devices 120, 122, 124.

In accordance with an exemplary embodiment, for example, the trick play options can include combined play 412, stop 1 422, stop 2 424, catch-up event 432, logical pause 434, combined forward (or fast-forward) 436, and combined rewind 452, which can be selected, for example, via a remote controller 150, 152, 154, via the selection of one or more keys on the remote controller 150, 152, 154. In accordance with an exemplary embodiment, the selection of play 432 can be configured on the playback synchronization service 210 to require each of the plurality of users 140, 142, 144, to make the play 412 selection to invoke playing of the video content. Alternatively, the selection of play 412 can be configured to a global setting requiring each of the users 140, 142, 144 to select play 412, or a portion of the users 140, 142, 144, for example, if a large number of users are viewing the video content, e.g., at least 50% or more of the users 140, 142, 144.

Once the video content begins playing live 320, signals for individual users stops 422, 424, can be include in which an individual user 140, 142, 144, can stop the playback of the video content for only the media consumption device 120, 122, 124 of the individual user 140, 142, 144, which has selected, for example, the stop 1 422, or stop 2 424. Thus, as shown in FIG. 4, the events, for example, live play 420 is a function of events from individual players 140, 142, 144 that must act in concert for such actions, such as, combined forward 436 to occur. In addition, as described above, the logical pause 434, which can also be a stop, can cause the playback of the video content to be paused 440. In addition, a catch up event (or forwarding) 432 for one or more of the plurality of media consumption devices 120, 122, 124, after an individual user 140, 142, 144 has executed an individual stop 422, 424 can be performed.

In accordance with an exemplary embodiment, the inputs can also include a combined forwarding 436, a combined play 412, and a combined rewind 452. In accordance with an exemplary embodiment, in the combined forwarding 436, the combined play 412, and the combined rewind 452, each of the plurality of media consumption devices 120, 122, 124 will receive a corresponding signal from the playback synchronization service 210 to execute the corresponding trick play.

As shown in FIG. 4, for example, the combined play 420, the combined forward 430, and the combined logical pause 440, are each initiated as a function of events from the individual users, for example, user 1 140 and user 2 142, which acts be each of the users 140, 142 are combined to cause the event 420, 430, 440 to occur. In accordance with an exemplary embodiment, the playback synchronization service 210 can include a programmable algorithm configured to execute the states 300, 400 of the media consumption devices 120, 122, 124 as disclosed herein.

Figure 5:
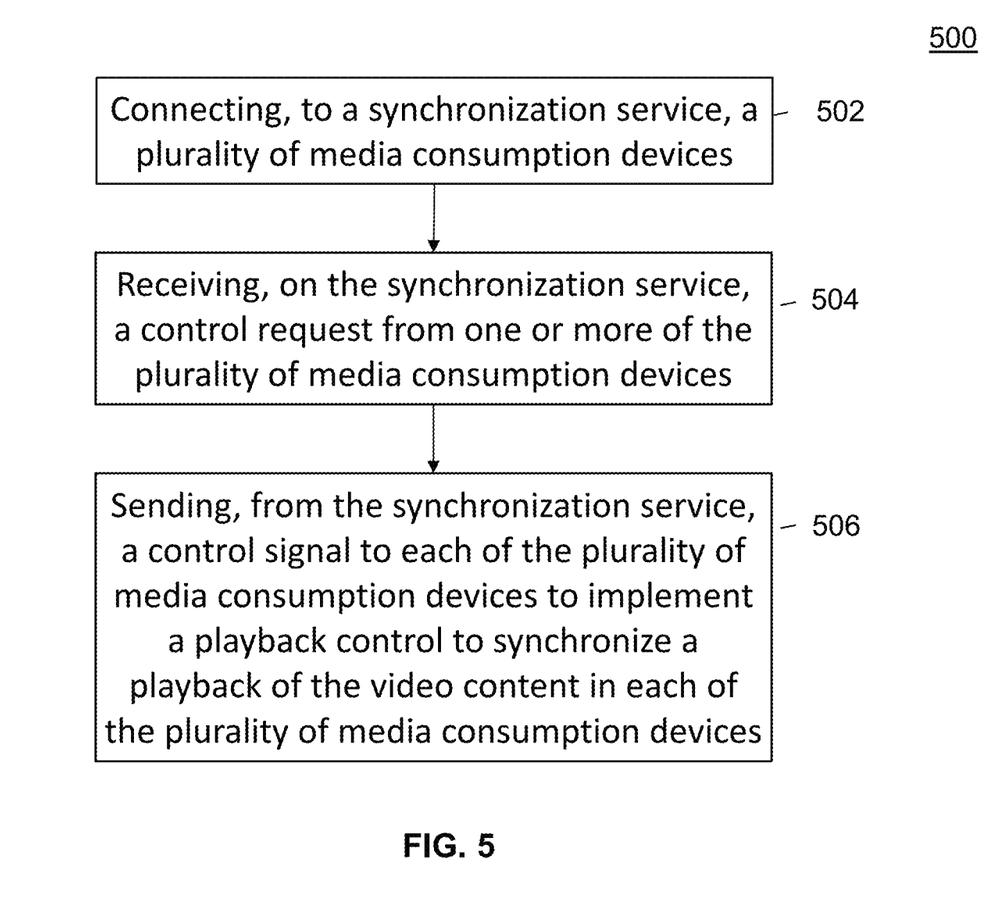
FIG. 5 is a flowchart illustrating a method for synchronized playback controls for parallel viewing of video content.

FIG. 5 is a flowchart 500 illustrating a method for synchronized playback controls for parallel viewing of video content. As shown in FIG. 5, in step 502, a synchronization service is connected to a plurality of media consumption devices. In step 504, the synchronization service receives a control request from one or more of the plurality of media consumption devices. In step 506, the synchronization service sends a control signal to each of the plurality of media consumption devices to implement a playback control to synchronize a playback of the video content in each of the plurality of media consumption devices. The control request, for example, is a trick play request and wherein the trick play request is one or more of stop, pause, resume, skip, fast forward, or rewind.

In accordance with an exemplary embodiment, the control request must be received from each of the plurality of media consumption devices before the control signal is sent to each of the plurality of media consumption devices. For example, the control request is a request to begin play of the video content, and the method includes requiring each of the plurality of media consumption devices to send a control request to begin the play of the video content.

In accordance with an exemplary embodiment, the synchronization service receives the control request from the one or more media consumption devices via an input of a remote controller in communication with the one or more media consumption devices.

In accordance with an exemplary embodiment, the hosting and executing of the synchronization service is on one or more cloud servers. Alternatively, the hosting and executing of the synchronization service can be on one of the one or more media consumption devices.

Computer System Architecture

Figure 6:
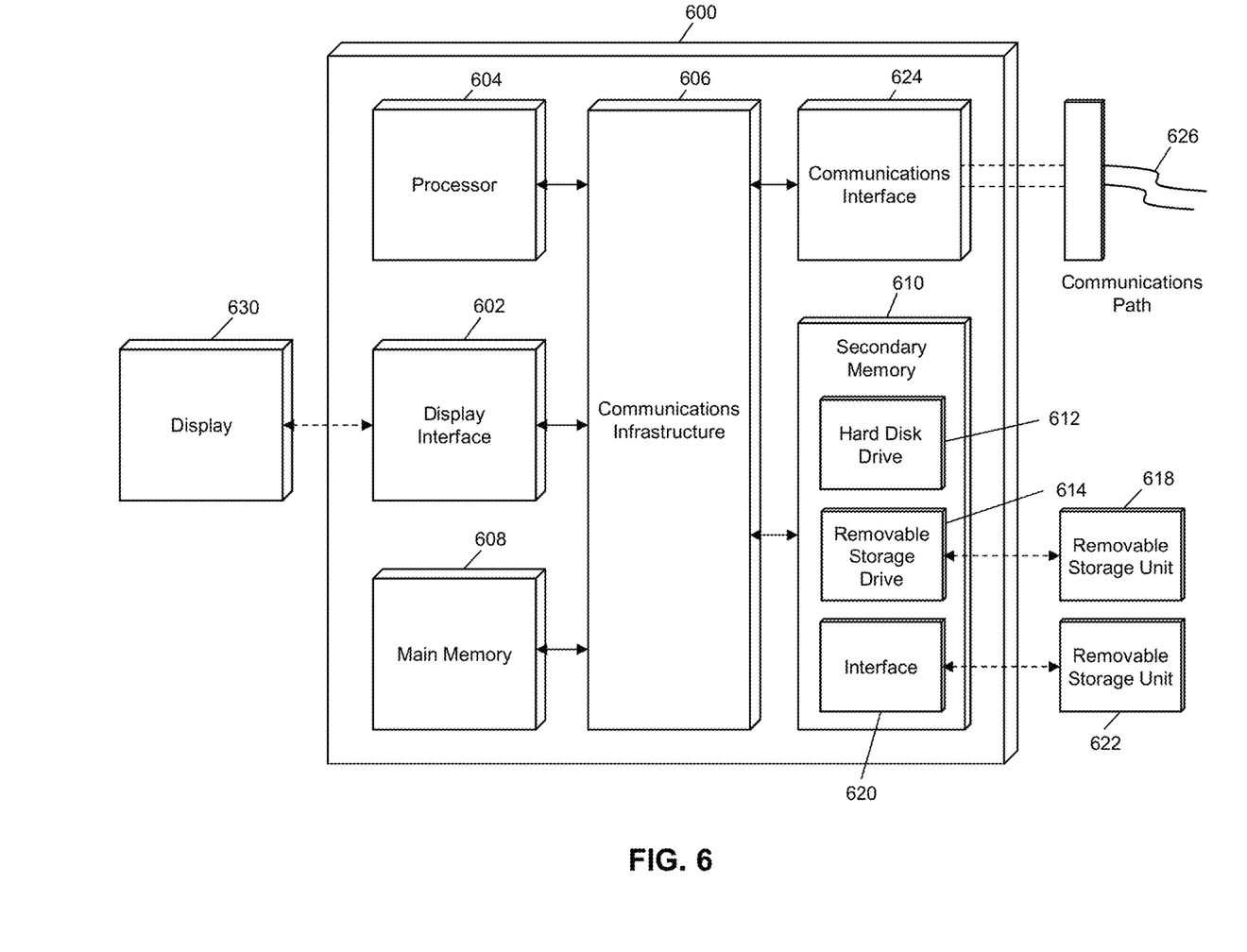
FIG. 6 is an exemplary hardware architecture for an embodiment of a communication device.

FIG. 6 illustrates a representative computer system 600 in which embodiments of the present disclosure, or portions thereof, may be implemented as computer-readable code executed on hardware. For example, the content provider 110, the media consumption devices 120, 122, 124, the remote media play devices 130, 132, 134, the synchronization service 210, and corresponding one or more cloud servers of FIGS. 1-5 may be implemented in whole or in part by a computer system 600 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this representative computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 604 may be processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 1-5, as discussed herein. Accordingly, such computer programs may represent controllers of the computer system 600. Where the present disclosure is implemented using software executed on hardware, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software executed on hardware, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, a method and system for synchronized playback controls for parallel viewing of video content. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for synchronized playback controls for viewing of video content, the method comprising:
   connecting, to a synchronization service, a plurality of media consumption devices;
   receiving, on the synchronization service, a control request from each of the plurality of media consumption devices, the control request being a user input trickplay request; and
   in response to receiving the control requests, sending, from the synchronization service, a control signal to each of the plurality of media consumption devices to implement a playback control corresponding to the control request to synchronize a playback of the video content in each of the plurality of media consumption devices.

2. The method according to claim 1, wherein the the user input trick play request is one or more of stop, pause, resume, skip, fast forward, or rewind.

3. The method according to claim 1, wherein the control request is a request to begin play of the video content, the method comprising:
   requiring each of the plurality of media consumption devices to send the control request to begin the play of the video content.

4. The method according to claim 1, further comprising:
   receiving, on the synchronization service, the control request from the one or more of the plurality of media consumption devices via an input of a remote controller in communication with the one or more of the plurality of media consumption devices.

5. The method according to claim 1, further comprising:
   hosting and executing the synchronization service on one or more cloud servers.

6. The method according to claim 1, further comprising;
   hosting and executing the synchronization service on one of the one or more of the plurality of media consumption devices.

7. The method according to claim 1, further comprising:
   receiving, by the synchronization service, a join request from a new media consumption device;
   sending, by the synchronization service, current state and position parameters of the video content being viewed by the one or more media consumption devices.

8. A non-transitory computer readable medium storing computer readable program code that, when executed by a processor, causes the processor to provide synchronized playback controls for viewing of video content, the program code comprising instructions for:
   connecting, to a synchronization service, a plurality of media consumption devices;
   receiving, on the synchronization service, a control request from each of the plurality of media consumption devices, the control request being a user input trickplay request; and
   in response to receiving the control requests, sending, from the synchronization service, a control signal to each of the plurality of media consumption devices to implement a playback control corresponding to the control request to synchronize a playback of the video content in each of the plurality of media consumption devices.

9. The non-transitory computer readable medium according to claim 8, wherein the user input trick play request is one or more of stop, pause, resume, skip, fast forward, or rewind.

10. The non-transitory computer readable medium according to claim 8, wherein the control request is a request to begin play of the video content, the program code further comprising instructions for:
    requiring each of the plurality of media consumption devices to send the control request to begin the play of the video content.

11. The non-transitory computer readable medium according to claim 8, the program code further comprising instructions for:
    receiving, on the synchronization service, the control request from the one or more of the plurality of media consumption devices via an input of a remote controller in communication with the one or more of the plurality of media consumption devices.

12. The non-transitory computer readable medium according to claim 8, the program code further comprising instructions for:
    hosting and executing the synchronization service on one or more cloud servers.

13. The non-transitory computer readable medium according to claim 8, the program code further comprising instructions for:
    hosting and executing the synchronization service on one of the one or more of the plurality of media consumption devices.

14. A system for synchronized playback controls for viewing of video content, the system comprising:
    a memory; and
    a processor configured to:
       connect to a plurality of media consumption devices;
       receive a control request from each of the plurality of media consumption devices, the control request being a user input trickplay request; and
       in response to receiving the control requests, send a control signal to each of the plurality of media consumption devices to implement a playback control corresponding to the control request to synchronize a playback of the video content in each of the plurality of media consumption devices.

15. The system according to claim 14, wherein the user input trick play request is one or more of stop, pause, resume, skip, fast forward, or rewind.

16. The system according to claim 14, wherein the control request is a request to begin play of the video content, the processor is further configured to:
   require each of the plurality of media consumption devices to send the control request to begin the play of the video content.

17. The system according to claim 14, wherein the processor is further configured to:
   receiving the control request from the one or more of the plurality of media consumption devices via an input of a remote controller in communication with the one or more of the plurality of media consumption devices.

18. The system according to claim 14, wherein synchronization of the playback of the video content in each of the plurality of media consumption devices is hosted and executed on one of the one or more of the plurality of media consumption devices.

* * * * *